R. P. BUTTLES.

Improvement in Hoes.

No. 132,520.　　　　　　　　　　　　Patented Oct. 29, 1872.

Witnesses.　　　　　　　　　　　　Inventor.

UNITED STATES PATENT OFFICE.

REUBEN P. BUTTLES, OF MANSFIELD, PENNSYLVANIA.

IMPROVEMENT IN HOES.

Specification forming part of Letters Patent No. 132,520, dated October 29, 1872.

*To all whom it may concern:*

Be it known that I, REUBEN P. BUTTLES, of Mansfield, Tioga county, in the State of Pennsylvania, have invented certain Improvements in Garden-Hoes, of which the following is a specification:

My invention relates to garden-hoes provided with swinging forks, one being attached to each edge on the right and left of hoe-blade for loosening the earth among tender vegetables, flowers, &c.; also for raking out weeds or other rubbish from between the rows, which is done by turning the forks up from the cutting-edge of the hoe.

Figure 1:
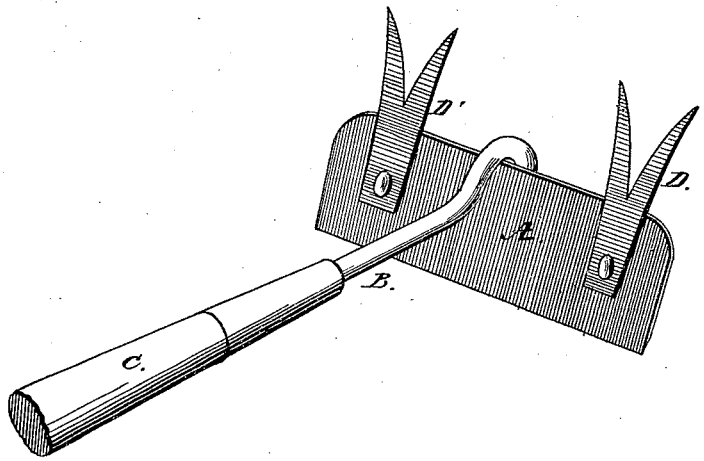
Figure 2:
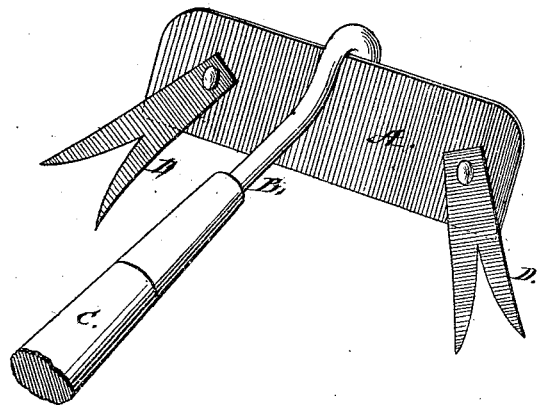

Figure 1 is a view of garden-hoe made as other hoes, only smaller, and with my improvement attached in form to be used as a rake. Fig. 2 is a plan of the same with my improvements attached in a manner to be used for removing weeds from among vegetables standing in rows near together; also for loosening the earth among vegetables, flowers, &c.

These forks are made of thin steel, about No. 16 or 18 United States standard gage, about one inch and three-quarters long, and five-eighths broad at the points, and fastened to the hoe by a rivet through one end of fork, securely headed down, but not so tightly as to prevent being swung round to any angle desired.

Having thus described my invention, what I claim as new, and desire to secure by Letters Patent, is—

A hoe provided with swinging forks D, when arranged substantially and for the purposes as set forth.

REUBEN P. BUTTLES.

Witnesses:
 C. W. WILSON,
 A. E. CUTTING.